US 9,356,337 B2

(12) United States Patent
Seo et al.

(10) Patent No.: US 9,356,337 B2
(45) Date of Patent: May 31, 2016

(54) PORTABLE TERMINAL

(71) Applicant: Samsung Electronics Co. Ltd., Suwon-si, Gyeonggi-do (KR)

(72) Inventors: Jae-Il Seo, Suwon-si (KR); Young-Gyun Kim, Yongin-si (KR); Seung-Hoon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 13/768,682

(22) Filed: Feb. 15, 2013

(65) Prior Publication Data
US 2013/0222192 A1 Aug. 29, 2013

(30) Foreign Application Priority Data

Feb. 23, 2012 (KR) .................. 10-2012-0018512
Feb. 23, 2012 (KR) .................. 10-2012-0018585

(51) Int. Cl.
*H01Q 1/24* (2006.01)
*H04M 1/02* (2006.01)
*H04R 1/02* (2006.01)
*H04M 1/03* (2006.01)

(52) U.S. Cl.
CPC .............. *H01Q 1/243* (2013.01); *H04M 1/026* (2013.01); *H04M 1/0262* (2013.01); *H04R 1/02* (2013.01); *H04M 1/035* (2013.01); *H04M 2250/12* (2013.01)

(58) Field of Classification Search
CPC ..... H01Q 1/243; H04M 1/026; H04M 1/0262
USPC ................. 343/702; 455/575.1, 575.5, 575.7
See application file for complete search history.

(56) References Cited

U.S. PATENT DOCUMENTS

| 4,581,654 | A | * | 4/1986 | Kobayashi | H04N 3/127 348/790 |
| 6,501,429 | B2 | * | 12/2002 | Nakamura | G01S 19/34 343/700 MS |
| 8,260,385 | B2 | | 9/2012 | Kim et al. | |
| 2005/0049014 | A1 | * | 3/2005 | Nelson | H01Q 1/007 455/575.1 |
| 2005/0248492 | A1 | * | 11/2005 | Ryu | H01Q 9/0407 343/702 |
| 2009/0305755 | A1 | * | 12/2009 | Lee | H01Q 1/243 455/575.4 |

FOREIGN PATENT DOCUMENTS

| EP | 2280490 A2 | 2/2011 |
| EP | 23930263 A1 | 12/2011 |
| KR | 10-2011-0080945 A | 7/2011 |
| WO | 2004/028120 A2 | 4/2004 |
| WO | 2008/014102 A2 | 1/2008 |
| WO | 2008/136238 A1 | 11/2008 |

* cited by examiner

*Primary Examiner* — Tho G Phan
(74) *Attorney, Agent, or Firm* — Jefferson IP Law, LLP

(57) ABSTRACT

A portable terminal which can be made light, slim, short, and small is provided. The portable terminal includes an antenna mounted to an inner side surface of a body of the portable terminal, and a rear case covering at least a portion of an inner side of the body and having a battery mounting space. The antenna and the rear case are separably coupled to a rear surface of the body to be exposed to outside the rear surface of the body. The portable terminal may include a speaker module provided at an upper end of a body of the portable terminal within the body, a mounting plate mounted to one side of the speaker module within the body, and a microphone holder fixed to one surface of the mounting plate. The portable terminal can be miniaturized by reducing installation widths of parts disposed parallel to a speaker module.

11 Claims, 6 Drawing Sheets

PORTABLE TERMINAL

PRIORITY

This application claims the benefit under 35 U.S.C. §119 (a) of a Korean patent application filed on Feb. 23, 2012 in the Korean Intellectual Property Office and assigned Serial No. 10-2012-0018512, and a Korean patent application filed on Feb. 23, 2012 in the Korean Intellectual Property Office and assigned Serial No. 10-2012-0018585, the entire disclosure of each of which is hereby incorporated by reference.

BACKGROUND OF THE INVENTION

1. Field of the Invention

The present invention relates to a portable terminal. More particularly, the present invention relates to a portable terminal by which an interior space thereof can be efficiently utilized and a performance of an antenna can be improved, and which can be made light, slim, short, and small.

2. Description of the Related Art

In general, a portable terminal refers to a device, such as a digital audio player, a Portable Multimedia Player (PMP), an electronic book, and a portable communication device, which allows a user to access various contents while being carried by the user. Form factors of such portable terminals are diversified according to their purposes, the current trend, or demands of consumers. Bar type portable terminals, such as smart phones or tablet Personal Computers (PCs), which have various functions, are increasingly used.

More particularly, an antenna for communications is provided in a portable terminal such as a smart phone. Antennas may be classified into external antennas protruding outside of portable terminals and internal antennas disposed within portable terminals. In particular, internal antennas are widely used, considering sophistication, good designs, and portability of portable terminals. An antenna provided in a portable terminal according to the related art is disclosed in Korean Unexamined Patent Publication No. 10-2011-0080945, which published on Jul. 13, 2011 and is entitled 'Portable Terminal'.

FIG. 1 is a view showing a portable terminal according to the related art, and FIG. 2 is a sectional view taken along line A-A' shown in FIG. 1.

Referring to FIGS. 1 and 2, the portable terminal 10 includes a body 11, an antenna 12 disposed within the body 11, a rear case 13 covering the antenna 12 and a module (which will be described below) disposed within the body 11.

Various types of the portable terminal 10 such as a bar type, a slide type, and a folder type may be realized according to a form of the portable terminal 10. The antenna 12 mounted within the body 11 is covered by the rear case 13. Further, in a bar type portable terminal 10, the antenna 12 is disposed at an upper inner side and a lower inner side of the body 11 according to a performance thereof. The rear case 13 has a same size as that of the body 11 to cover the rear surface of the body 11, and is covered by a battery cover 14 or is exposed to the outside. A battery mounting space S is formed in the rear case 13 so that a battery (not shown) may be attached to or detached from the rear case 13. The battery cover 14 is detachably disposed on the rear surface of the body 11 to cover the rear surface of the body 11. For example, the battery cover 14 may cover the entire surface of the rear case 13. In a state in which the portable terminal 10 is stacked, the antenna 12 is provided within the body 11, the rear case 13 covers the surface of the antenna 12, and the battery cover 14 covers the surface of the rear case 13. Further, the antenna 12 is spaced apart from the rear case 13 by a predetermined space to realize a performance thereof. Thus, the rear case 13 and the battery cover 14 are sequentially stacked to cover an upper end of the antenna 12 while the antenna 12 is installed within the body 11. Thus, at a mounting location of the antenna 12 where the portable terminal 10 is folded, a thickness of the portable terminal 10 corresponds to a total sum of a space spaced apart from the rear case 13 on the upper side of the antenna 12, a thickness of the rear case 13, and a thickness of the battery cover 14. Thus, as an overall size of the portable terminal 10 increases, a performance of the antenna 12 cannot be properly realized, which works against further development. Further, a size of the antenna is limited as it is disposed between the body 11 and the rear case 13. For example, as the size of the antenna 12 becomes smaller, the performance of the antenna 12 cannot be properly realized. In addition, when the rear case 13 is formed of a metallic material to increase strength of the portable terminal, the antenna 12 is covered by the metallic rear case 13, lowering a performance of the antenna 12.

Moreover, various modules are provided at an upper end of the body in addition to the antenna. This structure will be described with reference to FIGS. 3 and 4.

FIG. 3 is a view showing a part disposition structure at an upper end of the portable terminal shown in FIG. 1. More particularly, FIG. 3 shows various parts disposed at an upper end of the body of the portable terminal 11. FIG. 4 is a partial cutaway sectional view showing a portion of the portable terminal shown in FIG. 3.

As shown in FIGS. 3 and 4, a speaker module 15 is disposed at a center of an upper end of the body 11 in addition to the antenna described with reference to FIGS. 1 and 2, and a camera module 17, a proximity sensor 16, an ear jack 18, a microphone holder 20, and a broadcasting antenna unit 19 are disposed on opposite sides of the speaker module 15. A window member 24 is mounted to a front surface of the body 11.

The camera module 17 is utilized during a video call or when a user desires to photograph him or herself, and the proximity/illumination sensor 16 is a module in which a proximity sensor and an illumination sensor are integrated, and detects an amount of peripheral light or a contact of a body of a user. A display unit is activated or an intensity of illumination is adjusted according to an amount of peripheral light detected by the proximity/illumination sensor 16. The ear jack 18 is utilized for connection to a general earphone or a headset providing a hands-free function, and the microphone holder 20 is mounted to accommodate the microphone 21. The microphone 23 accommodated in the microphone holder 20 receives peripheral sounds in a voice communication mode, and another microphone is positioned close to the mouth of the user, separately from the microphone 23 accommodated in the microphone holder 20, to receive a voice of the user. A voice of the user is reinforced in a voice communication through a separate voice processing process by comparing sounds input through the microphones, respectively. Further, the microphone 23 accommodated in the microphone holder 20 may be utilized when peripheral sounds including a voice of the user are input when a video is photographed or in a video communication mode. The broadcasting antenna unit 19 is a broadcast receiving antenna, and may be extended outside of the body 11 according to a need of the user while being used. That is, since a broadcast receiving function is utilized only when the user desires to use the broadcast receiving function, unlike a mobile communication function, the broadcasting antenna unit 19 does not need to be always connected to a broadcast receiving circuit and may be structured so as to be extended to be connected to the broadcast receiving circuit only when needed.

Meanwhile, the microphone holder 20 includes a sound wave guide 21, and the sound wave guide 21 extends from one end of the microphone holder 20 and is connected to a through-hole 22 formed in the rear case 13 of the body 11. The sound wave guide 21 connects the microphone 23 accommodated in the microphone holder 20 to the through-hole 22. That is, the sound wave guide 21 is utilized as a sound input wave guide together with the through-hole 22.

The camera module 17, the proximity/illumination sensor 16, speaker module 15, the ear jack 18, the microphone holder 20, and the broadcasting antenna unit 19 are disposed at peripheries of the display unit, and in particular, are generally disposed in parallel to the speaker module 15 disposed at a center of an upper end of the portable terminal. The main board 25 is installed within the body 11, but generally, the main board 25 is not disposed in an area in which the parts at the peripheries of the display unit are disposed. The parts may be connected to the main board 25 through a separate flexible printed circuit board or a connector.

However, as the parts are disposed in parallel to the speaker module, there are many difficulties in miniaturizing the portable terminal, in particular, in reducing a width of the portable terminal. That is, as the parts occupying a physical space are disposed in parallel, a sufficient width needs to be secured for the body of the portable terminal to secure a disposition space of the parts. Moreover, as sound quality is emphasized while a multimedia function of the portable terminal is prioritized, there is a need to secure a sufficient resonance space for the speaker module. However, as the number of parts disposed in parallel to the speaker module increases, there occurs a difficulty in securing a resonance space for the speaker module.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a portable terminal that can be made light, slim, short, and small, and by which strength thereof can be increased and a performance of an antenna can be improved.

Another aspect of the present invention is to provide a portable terminal which has a disposition structure by which a utilization efficiency of an interior space thereof can be improved, and which can be miniaturized.

In accordance with another aspect of the present invention, a portable terminal is provided. The portable terminal includes an antenna mounted to an inner side surface of a body of the portable terminal, and a rear case covering at least a portion of an inner side of the body and having a battery mounting space, wherein the antenna and the rear case are separably coupled to a rear surface of the body so as to be exposed to outside the rear surface of the body.

The portable terminal may further include a cover provided on the rear surface of the body, the cover covering the antenna and the rear case.

The antenna may include an upper antenna disposed at an upper end of the body, and a lower antenna disposed at a lower end of the body.

The rear case may be disposed between the upper antenna and the lower antenna, and an upper end of the rear case may be coupled to the upper antenna along a circumference of a lower end of the upper antenna and a lower end of the rear case is coupled to the lower antenna along a circumference of an upper end of the lower antenna.

The rear case may be formed of a metallic material.

When the cover is separated from the body, the antenna and the rear case may be exposed to outside the portable terminal.

The portable terminal may further include a coupling unit for coupling the rear case and the antenna.

The coupling unit may include a first opening formed at an end of the rear case, a second opening provided in the antenna and connected to the first opening to face the first opening, and a coupling member coupling the first opening and the second opening.

In accordance with another aspect of the present invention, a portable terminal is provided. The portable terminal includes a speaker module provided at an upper end of a body of the portable terminal within the body, a mounting plate mounted to one side of the speaker module within the body, and a microphone holder fixed to one surface of the mounting plate.

The portable terminal may further include at least one of a proximity sensor, an illumination sensor, an ear jack, a camera module, a Global Positioning System (GPS) module, and a gyro sensor. The at least one of the proximity sensor, the illumination sensor, the ear jack, the camera module, the GPS module, and the gyro sensor is installed within the body and is mounted to an opposite surface of the mounting plate.

The proximity sensor and the illumination sensor may form a proximity/illumination sensor that is mounted to the opposite surface of the mounting plate.

The portable terminal of claim 14 may further include a flexible printed circuit board connecting the proximity/illumination sensor to the camera module, the proximity/illumination sensor being disposed at one side of the camera module.

The portable terminal may further include a double-sided tape provided on the opposite surface of the mounting plate, the proximity/illumination sensor being attached to the mounting plate via the double sided tape.

The portable terminal may further include a second flexible printed circuit board extending from the camera module, and a connector provided on one surface of the second flexible printed circuit board, the second flexible printed circuit board connecting the camera module and the proximity/illumination sensor to a main board of the portable terminal.

The mounting plate may include at least one fastening rib fastened to a microphone holder.

The microphone holder may have fastening recesses formed on one surface thereof, and at least one pair of fastening ribs may be formed to face each other so as to be engaged with the fastening recesses, respectively.

The portable terminal may further include a boss formed on an inner peripheral surface of the body, a screw hole provided at one end of the mounting plate, and a screw passing through the screw hole and coupled to the boss, the mounting plate being fixed to the body by the screw.

The portable terminal may further include a through-hole formed at an upper end of the body, and a sound wave guide formed in the microphone holder, the through-hole and the sound wave guide being connected to each other to form a sound input wave guide.

In accordance with still another aspect of the present invention, a portable terminal is provided. The portable terminal includes a speaker module provided at an upper end of a body of the portable terminal within the body, a mounting plate mounted to one side of the speaker module within the body, fastening ribs formed of bent portions of the mounting plates, a microphone holder fixed to one surface of the mounting plate, and a proximity/illumination sensor in which a proximity sensor and an illumination sensor are integrated as a single body, wherein the fastening ribs are fastened to the microphone holder, and the proximity/illumination sensor is attached to an opposite surface of the mounting plate.

In accordance with yet another aspect of the present invention, a portable terminal is provided. The portable terminal includes a speaker module installed at an end of a body of the portable terminal in a first direction within the body, at least one of a sensor disposed to face a front surface of the body, an ear jack, a camera module, a GPS module, which is disposed to be parallel to the speaker module in a second direction within the body, and a microphone disposed on a rear surface of the at least one of the sensor, the ear jack, the camera module, and the GPS module.

The sensor may be a proximity/illumination sensor in which a proximity sensor and an illumination sensor are integrated as a single body and are combined within the body, and the microphone may be attached to the rear surface of the proximity/illumination sensor.

The portable terminal may further include a double sided tape for attaching the microphone to the rear surface of the proximity/illumination sensor.

The first direction may be a lengthwise direction of the portable terminal and the second direction may be a widthwise direction of the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as first and second are used in the present disclosure, they are used only to classify objects having the same title and their orders may be arbitrary. Further, a preceding description may be applied to the following objects.

Figure 5:
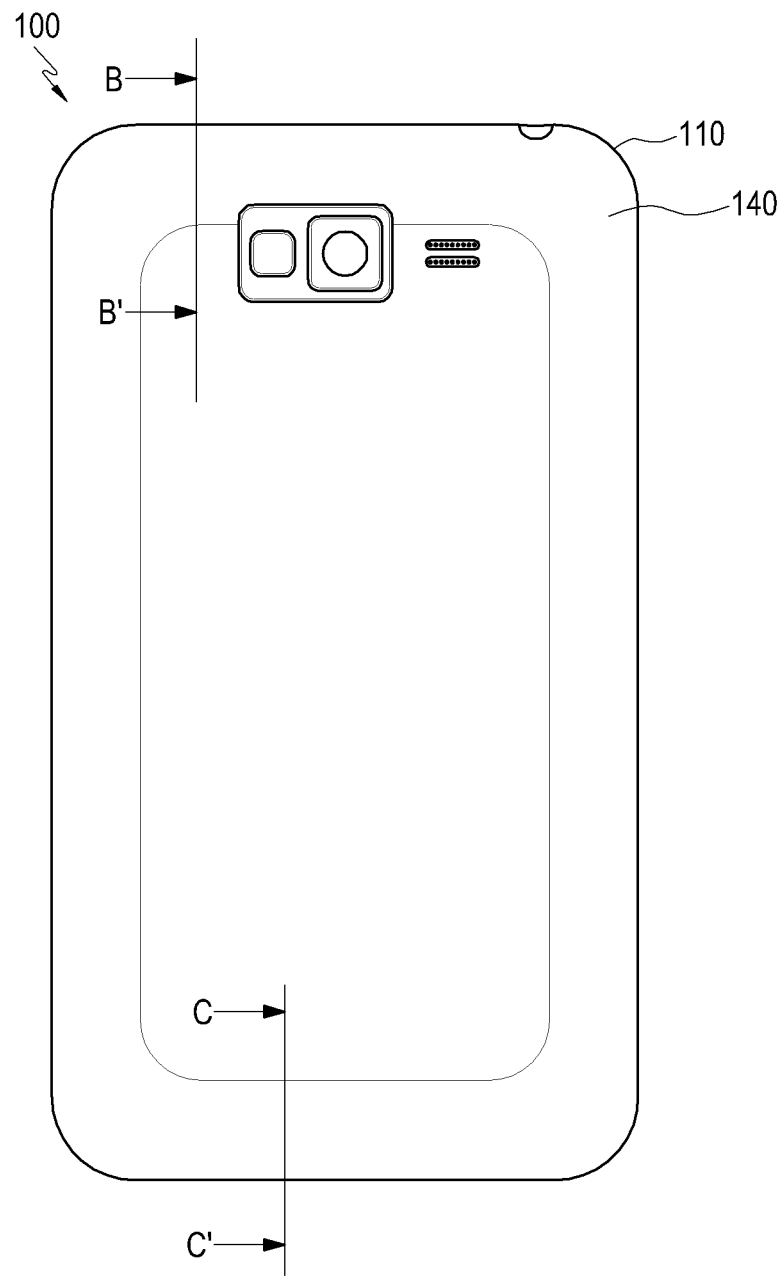
FIG. 5 is a view showing a portable terminal according to an exemplary embodiment of the present invention.
Figure 6:
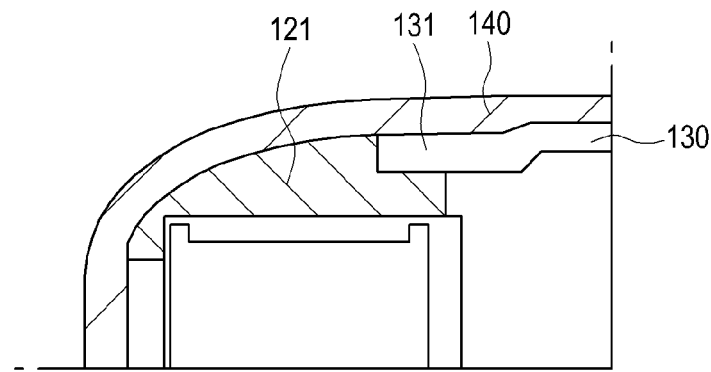
FIG. 6 is a sectional view taken along line B-B' shown in FIG. 5.
Figure 7:
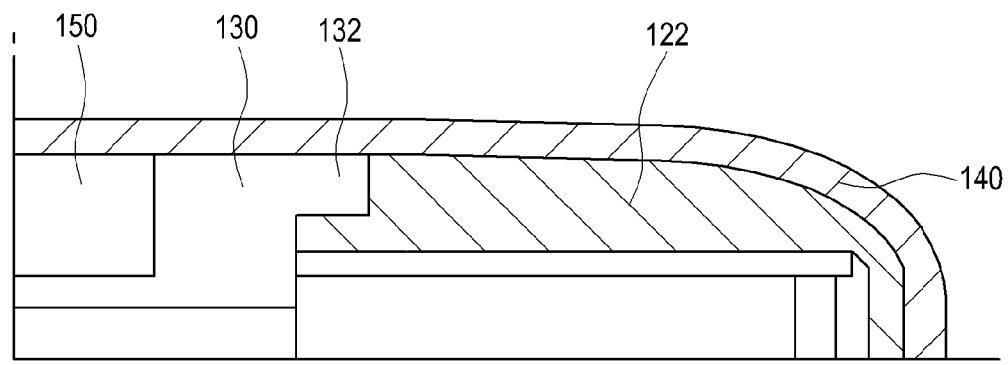
FIG. 7 is a sectional view taken along line C-C' shown in FIG. 5.

FIG. 5 is a view showing a portable terminal according to an exemplary embodiment of the present invention. FIG. 6 is a sectional view taken along line B-B' shown in FIG. 5. FIG. 7 is a sectional view taken along line C-C' shown in FIG. 5.

Referring to FIGS. 5 to 7, the portable terminal 100 includes a body 110, antennas 121 and 122, a rear case 130, a battery 150, and a cover 140. Although it is exemplified that the portable terminal 100 is a bar type in the present exemplary embodiment, the present invention is not limited thereto. For example, the present invention may be variously modified. That is, it is apparent that, for example, in a folding type portable terminal 100 including a body 110 and a pivotal body (not shown) pivoted in a direction away from the body 110, the body 110 may include antennas 121 and 122, a rear case 130, and a cover 140 as in the present exemplary embodiment.

The antennas 121 and 122 are mounted to an inner surface of the body 110. In detail, the antennas 121 and 122 include an upper antenna 121 mounted to an upper inner surface of the body 110, and a lower antenna 122 mounted to a lower inner surface of the body 110 to face the upper antenna 121. Although the antennas 121 and 122 are classified into the upper and lower antennas 121 and 122 in the present exemplary embodiment, the present invention is not limited thereto. For example, various modifications may be made on installation locations or the number of antennas 121 and 122 according to the types of the antennas 121 and 122. For example, one antenna 121 and 122 may be disposed at a periphery of the body 110. The antennas 121 and 122 are disposed adjacent to the rear case 130 at an upper end 131 of the rear case 130 and a lower end 132 of the rear case 130. When the cover 140 is not mounted, surfaces of the antennas 121 and 122 may be exposed to the outside of the body 110 together with the rear case 130. That is, the antennas 121 and 122 are mounted to an inner side of the body 110, the surfaces of the antennas 121 and 122 may be exposed to the outside if the cover 140 is separated from the body 110, and the surfaces of the antennas 121 and 122 are covered by the cover 140 when the cover 140 is mounted on the body 110. In a portable terminal according to the related art, since a rear case and a battery cover are folded on an upper surface of an antenna, a thickness of the portable terminal is relatively thick due to a thickness of the rear case and a space between the rear case and the antenna. However, in the portable terminal 100 of the present exemplary embodiment, since only the cover 140 is folded on the upper surfaces of the antennas 121 and 122, a thickness due to the thickness of the rear case 130 and the space between the rear case 130 and the antennas 121 and 122 can be reduced, making it possible to make the overall portable terminal 100 slimmer and to make sizes of the antennas 121 and 122 larger in a portable terminal 100 having the same size as a portable terminal of the related art, and thereby improve a signal transmitting/receiving capacity of the antennas 121 and 122.

Figure 8:
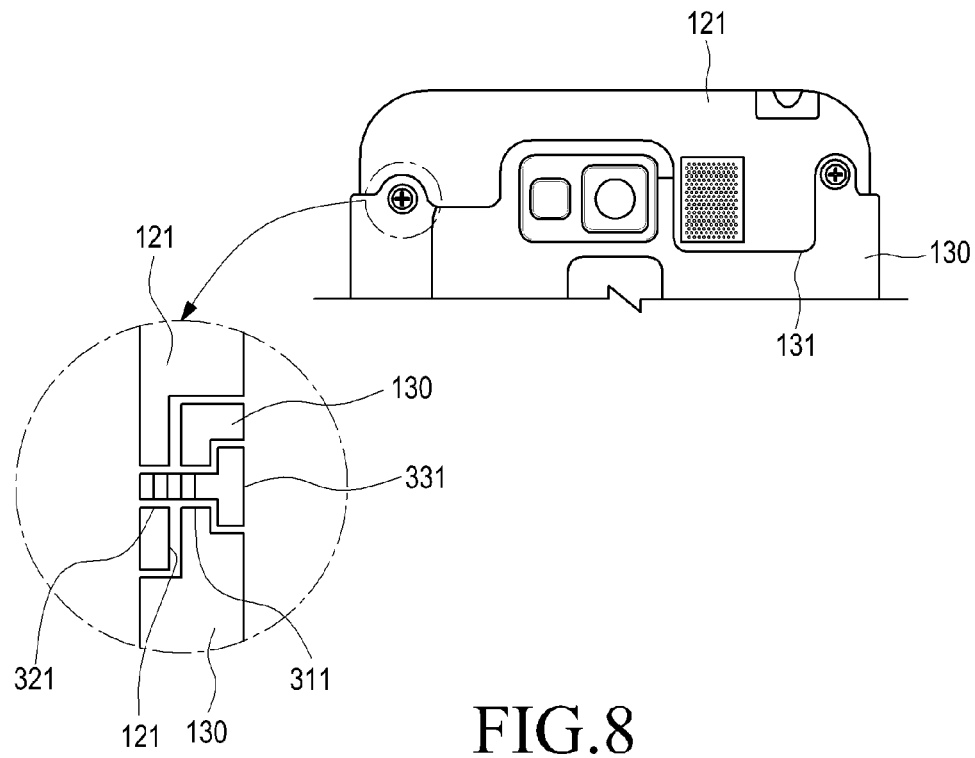
FIG. 8 is a view showing an upper side of the portable terminal shown in FIG. 5 while a battery cover is separated.
Figure 9:
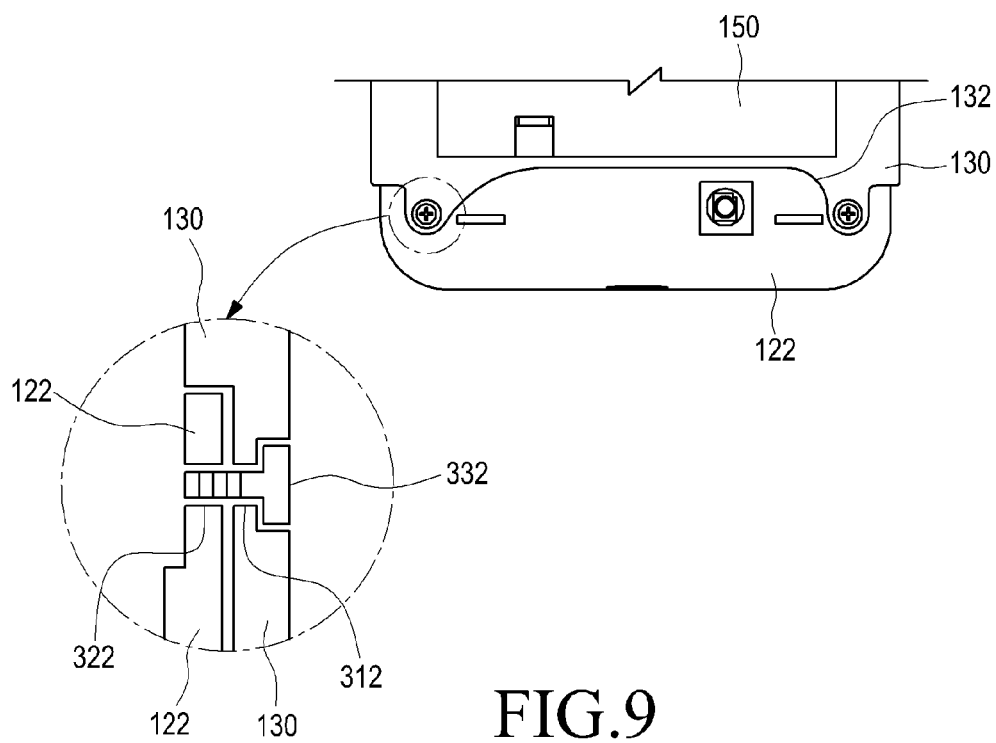
FIG. 9 is a view showing a lower side of the portable terminal shown in FIG. 5 while the battery cover is separated.

FIG. 8 is a view showing an upper side of the portable terminal shown in FIG. 5 while the battery cover is separated. FIG. 9 is a view showing a lower side of the portable terminal shown in FIG. 5 while the battery cover is separated.

Referring to FIGS. 8 and 9, the rear case 130 is disposed on a rear surface of the body 110 such that a module provided within the body 110 may be mounted or covered, and extends to be connected to ends of the antennas 121 and 122. In detail, the rear case 130 is installed between the upper and lower antennas 121 and 122 provided at upper and lower sides of the body 110. That is, an upper end 131 of the rear case 130 is coupled to a lower end of the upper antenna 121, and extends toward the lower antenna 122 along a circumference of the lower end of the upper antenna 121. Further, a lower end of the rear case 130 is coupled to an upper end of the lower antenna 122, and extends toward the upper antenna 121 along a circumference of the upper end of the lower antenna 122. If the upper and lower ends 131 and 132 of the rear case 130 are connected to the upper antenna 121 and the lower antenna 122, respectively, and the cover 140 is separated from the body 110, the upper antenna 121, the rear case 130, and the lower antenna 122 are exposed from the rear surface of the body 110 to the outside.

At least one coupling unit 311, 321, 331, 312, 322, and 332 is provided in the rear case 130 and the antennas 121 and 122 to couple the rear case 130 and the antennas 121 and 122. In the present exemplary embodiment, the coupling unit 311, 321, 331, 312, 322, and 332 includes first openings 311 and 312 provided in the rear case 130, second openings 321 and 322 connected to and engaged with the first opening 311 and 312 and provided in the antennas 121 and 122, and coupling members 331 and 332 coupling the first openings 311 and the second openings 321 and 322. However, the configuration of the coupling unit 311, 321, 331, 312, 322, and 332 is not limited thereto. That is, it is apparent that the coupling unit may be freely modified. For example, catching holes may be formed at ends of the antennas 121 and 122 and hooks may be formed at ends of the rear case 130 such that the hooks may be coupled to the catching holes.

A battery mounting space to which the battery 150 can be detachably attached may be formed in the rear case 130. Further, the rear case 130 may be formed of a metallic material to improve strength of the portable terminal 100. Thus, since the rear case 130 does not directly contact the antennas 121 and 122, performance of the antennas 121 and 122 is not influenced. Further, the rear case 130 supports a rear surface of the body 110 to increase strength of the portable terminal 100.

Hereinafter, a portable terminal for securing a resonance space of a speaker module and for making the portable terminal slimmer and smaller-sized at the same time will be described with reference to FIGS. 10 and 11.

Figure 10:
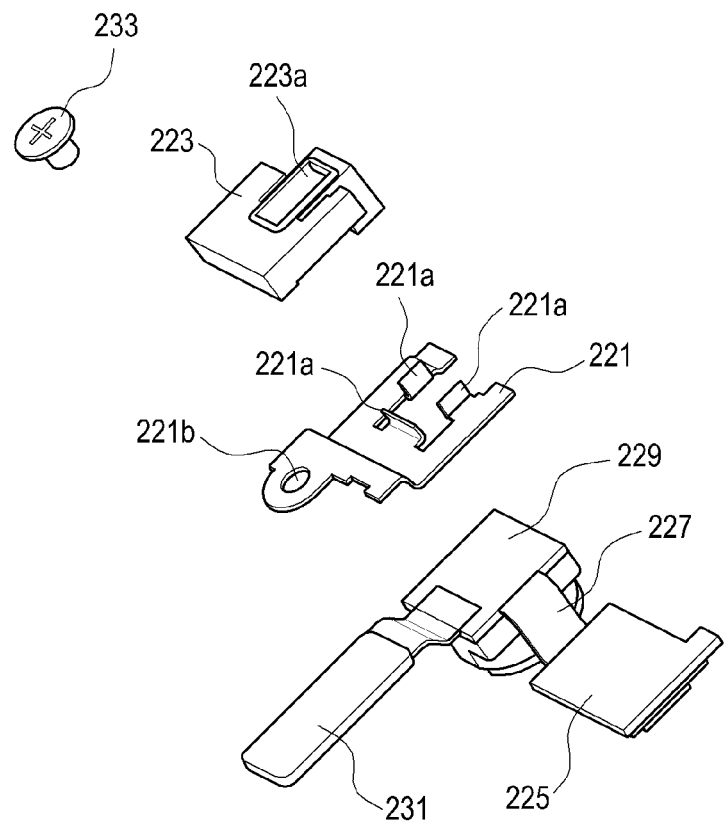
FIG. 10 is an exploded perspective view showing a structure in which parts of a portable terminal are stacked according to an exemplary embodiment of the present invention.

FIG. 10 is an exploded perspective view showing a structure in which parts of a portable terminal are stacked according to an exemplary embodiment of the present invention. FIG. 11 is a partial cutaway sectional view showing a portable terminal to which the stack structure shown in FIG. 10 is applied.

Figure 11:
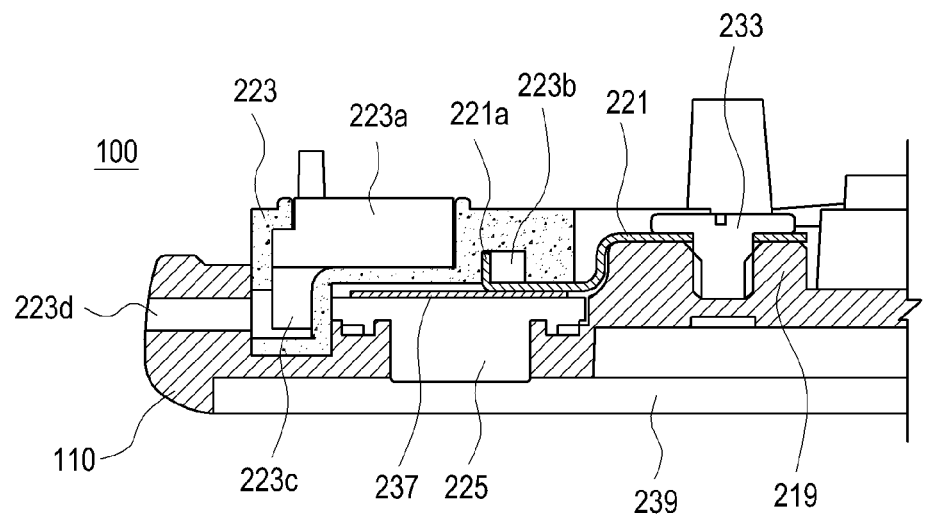
FIG. 11 is a partial cutaway sectional view showing a portable terminal to which the stack structure shown in FIG. 10 is applied.

Referring to FIGS. 10 and 11, the portable terminal 100 according to the present exemplary embodiment includes a mounting plate 221 for fixing at least one of constituent elements disposed adjacent to the speaker module at an upper end of the body 110 to the body 110. Hereinafter, in a description of the present exemplary embodiment, a configuration similar to that of a portable terminal of the related art shown in FIGS. 1-4 will be described with reference to the contents of the portable terminal which has been described with reference to FIGS. 5 to 9.

The portable terminal 100 includes a mounting plate 221 mounted within the body 110 at an end in a first direction, for example, an upper end in a lengthwise direction of the body 110, and a microphone holder 223 is installed on one surface of the mounting plate 221. The speaker module (not shown) constituting a speaker is mounted to a central portion of an upper end of the body 110, the mounting plate 221 is disposed at an upper end of the body 110 and at one side of the speaker module in parallel, in a second direction perpendicular to the first direction, that is, in a widthwise direction of the body 110, and the microphone holder 223 is mounted to a rear side of the mounting plate 221 on the portable terminal 100.

The mounting plate 221 may be constructed using a metallic material, for example, Stainless Use Steel (SUS). A screw hole 221b is formed at one end of the mounting plate 221, and fastening ribs 221a are formed at locations spaced apart from the screw hole 221b. The fastening ribs 221a are bent to protrude to one side of the mounting plate 221. While three fastening ribs are formed in the present exemplary embodiment, the present invention is not limited thereto. For example, the mounting plate 221 may be constructed with only one fastening rib.

A pair of fastening ribs 221a are formed to face each other, and the other fastening rib 221a is formed at one side of the facing fastening ribs. In addition, the fastening ribs 221a are bent perpendicular to one surface of the mounting plate 221 such that the pair of fastening ribs are parallel to each other and the remaining fastening rib is disposed perpendicular to the parallel fastening ribs. However, the fastening ribs 221a are configured to fix the microphone holder 223, and may be bent to press the microphone holder 223. In this case, it is noted that one surface of the mounting plate 221 and the fastening ribs 221a are not necessarily disposed to be perpendicular to each other.

A boss 219 is formed on an inner peripheral surface of the body 110 to fix the mounting plate 221 to the body 110. The mounting plate 221 is fixed within the body 110 by passing a screw 233 through the screw hole 221b to couple the screw 233 to the boss 219 while one end of the mounting plate 221 is attached to an upper surface of the boss 219.

The microphone holder 223 accommodates the microphone 223a to fix the microphone 223a within the body 110.

An upper surface of the microphone holder 223 remains open, and the microphone 223a is mounted to the opened upper surface of the microphone holder 223 and a sound input hole of the microphone 223a is located within the microphone holder 223. Referring to FIG. 11, a sound wave guide 223c is formed below the microphone 223a within the microphone holder 223, and is opened in a direction of the microphone holder 223. The sound wave guide 223c is connected to a through-hole 223d formed in the body 110, and is connected to the outside of the body 110. The through-hole 223d and the sound wave guide 223c form a sound input wave guide to the microphone 223a.

Fastening recesses 223b are formed on a lower surface of the microphone holder 223. The fastening recesses 223b are engaged with the fastening ribs 221a, and the fastening ribs 221a are accommodated in one of the fastening recesses 223b to be attached to an inner wall of the fastening recess 223b so as to press the inner wall of the fastening recess 223b. As mentioned above, the fastening ribs 221a are disposed substantially perpendicular to each other and perpendicular to one surface of the mounting plate 221, but may be inclinedly formed with respect to the mounting plate 221 to press the inner wall of the fastening recess 223b. Consequently, the microphone holder 223 is fastened and fixed to the mounting plate 221.

Meanwhile, the portable terminal 100 may include a speaker module constituting a speaker at a central portion of an upper end of the body 110, a proximity sensor disposed parallel to the speaker module, an illumination sensor, an ear jack, a camera module, a Global Positioning System (GPS) module, a gyro sensor, an antenna unit, etc. At least one of the proximity sensor, the illumination sensor, the ear jack, the camera module, the GPS module, the gyro sensor, and the antenna unit may be mounted to an opposite surface of the mounting plate 221 and stacked on the microphone holder 223.

In a detailed exemplary embodiment of the present invention, a module (hereinafter, referred to as 'proximity/illumination sensor') 225 in which a proximity sensor and an illumination sensor are integrated in a single body is exemplified as a part mounted to an opposite surface of the mounting plate 221. The proximity/illumination sensor 225 is attached to an opposite surface of the mounting plate 221 though a bonding unit such as a double-sided tape 237. Then, the proximity/illumination sensor 225 is connected to the camera module 229 through the flexible printed circuit board 227, and a second flexible printed circuit board 231 extending from the camera module 229 connects the camera module 229 and the proximity/illumination sensor 225 to a main board of the portable terminal 200. The second flexible printed circuit board 231 is connected to the main board through a connector provided at an end or one surface thereof. The proximity/illumination sensor 225 is arranged in parallel to the speaker module 113 together with the camera module 229 to face a front surface of the body 110, and is protected by a window member 239 mounted to the body 110. Accordingly, the microphone hole 223 is disposed on a rear side of the proximity/illumination sensor 225.

One of an ear jack, a camera module, a GPS module, a gyro sensor, an antenna unit, etc., may be mounted to an opposite surface of the mounting plate 221, instead of the proximity/illumination sensor 225. Meanwhile, it is preferable that the speaker module is independently disposed to secure a resonance space and prevent a sound output of the speaker module from being input to the microphone 223a. Further, it is apparent that a thickness of the portable terminal should be considered in selecting a part mounted to an opposite surface of the mounting plate 221.

Figure 1:
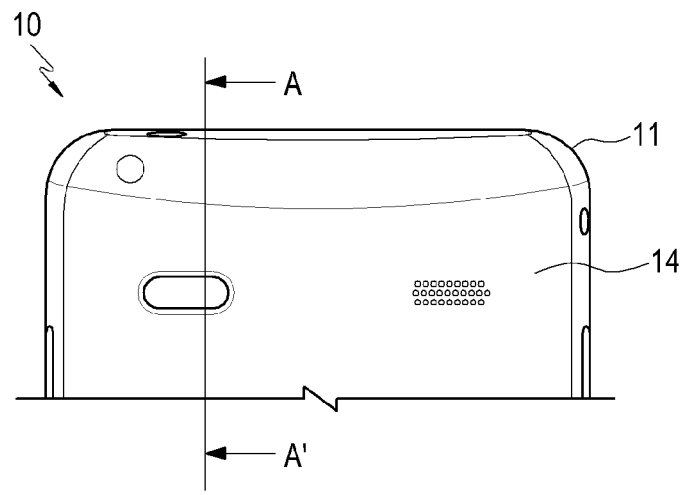
FIG. 1 is a view showing a portable terminal according to the related art.
Figure 2:
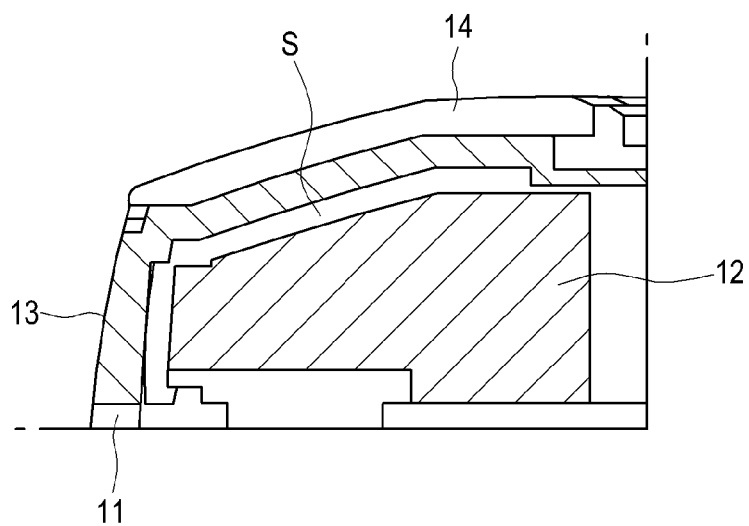
FIG. 2 is a sectional view taken along line A-A' shown in FIG. 1.
Figure 3:
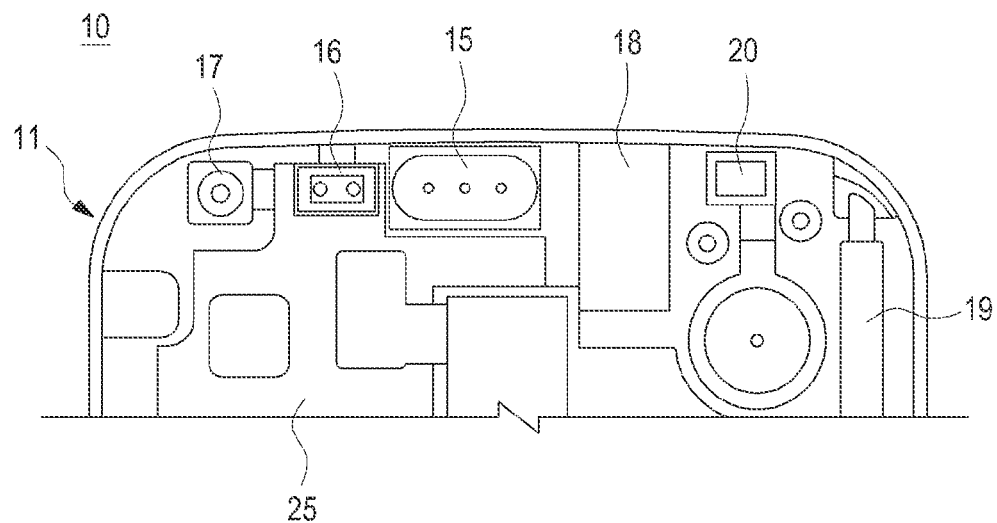
FIG. 3 is a view showing a part disposition structure at an upper end of the portable terminal shown in FIG. 1.
Figure 4:
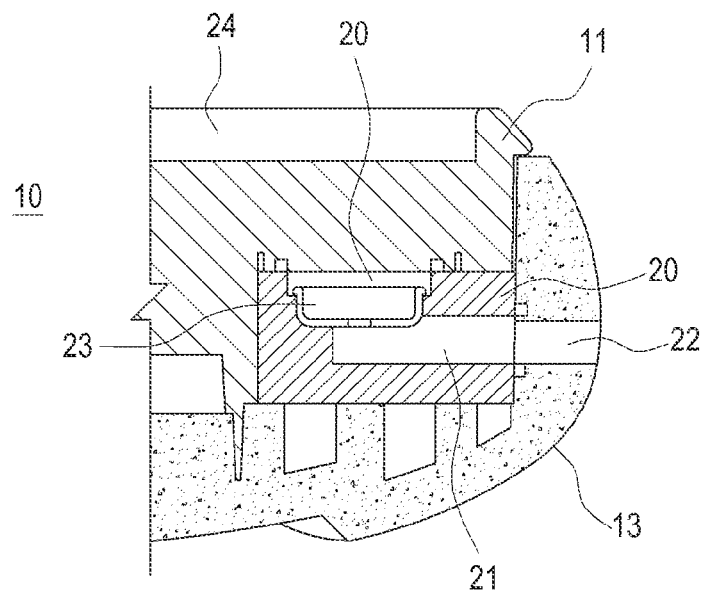
FIG. 4 is a partial cutaway sectional view showing a portion of the portable terminal shown in FIG. 3.

Assuming that, similar to the parts shown in FIG. 1, a camera module, a proximity/illumination sensor, a speaker module, an ear jack, a microphone holder, and an antenna unit are disposed at an upper end of the portable terminal according to the present exemplary embodiment, the proximity/illumination sensor 225 and the microphone holder 223 may be stacked in the portable terminal 100 according to the present invention as shown in FIGS. 3 and 4. Thus, a space in which one of a proximity/illumination sensor and a microphone holder according to the related art may be utilized as a resonance space of the speaker module 113. Further, since other parts such as a GPS module and a gyro sensor may be disposed even when the space is not utilized as a resonance space, a utilization efficiency of the interior space of the portable terminal can be improved. Meanwhile, if a marginal space secured by stacking the microphone holder and other parts is not utilized as a space for disposing a resonance space or other parts, the corresponding space can be removed to miniaturize the portable terminal.

Although the detailed exemplary embodiment of the present invention has been described, it is apparent to those skilled in the art to which the present disclosure pertains that various modifications can be made without departing from the scope of the present invention.

For example, although a mounting plate is provided to stack two different parts in the detailed exemplary embodiment of the present invention, the body 110 of the portable terminal, the microphone holder or the proximity/illumination sensor may be injection-molded and thus the mounting plate may be omitted if a structure in which the proximity/illumination sensor is combined with the body 110 is formed. That is, after the proximity/illumination sensor is assembled to be combined with the body 110, the microphone holder may be attached to a rear side of the proximity sensor by utilizing a bonding unit such as a double-sided tape. Then, if a portion of the microphone holder is attached to an inner peripheral surface of the body 110, the proximity/illumination sensor can be fixed more firmly.

Further, although the microphone is assembled through a separate holder in the detailed description of the exemplary embodiments of the present invention, the microphone itself may be assembled in the body 110 or the mounting plate of the portable terminal according to a shape thereof.

As described above, the antenna is separably coupled to the rear case to increase the size of the antenna, and accordingly, frequency bands of transmitted and received wireless signals can become higher.

Further, as a space between the antenna and the rear case and a thickness of the rear case according to the related art are reduced, the portable terminal can become lighter, slimmer, shorter, and smaller.

In addition, since the microphone holder is installed on one surface of the mounting plate and other parts such as a proximity/illumination sensor can be mounted to an opposite surface of the mounting plate in the portable terminal according to an exemplary embodiment of the present invention, installation widths of the part disposed parallel to the speaker module can be reduced. Thus, the portable terminal according to an exemplary embodiment of the present invention can be made smaller.

Furthermore, since a space for installing a speaker module can be further secured in a portable terminal having the same size by installing the mounting plate according to an exemplary embodiment of the present invention and stacking different parts, a resonance space of the speaker module can be expanded, thereby making it possible to improve sound quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
   an antenna mounted to an inner side surface of a body of the portable terminal, wherein the antenna includes a first surface and a second surface where the second surface is adjacent to the inner side surface of the body; and
   a rear case covering at least a portion of an inner side of the body, wherein the rear case includes a first surface, a second surface adjacent to the inner side of the body, and a battery mounting space,
   wherein the antenna and the rear case are separably coupled to a rear surface of the body so as to expose the first surface of the antenna and the first surface of the rear case to outside the rear surface of the body, and
   wherein a portion of the first surface of the antenna is substantially planar to a portion of the first surface of the rear case.

2. The portable terminal of claim 1, further comprising:
   a cover provided on the rear surface of the body, the cover covering the antenna and the rear case.

3. The portable terminal of claim 2, wherein the antenna comprises:
   an upper antenna disposed at an upper end of the body; and
   a lower antenna disposed at a lower end of the body.

4. The portable terminal of claim 3, wherein the rear case is disposed between the upper antenna and the lower antenna, and an upper end of the rear case is coupled to the upper antenna along a circumference of a lower end of the upper antenna and a lower end of the rear case is coupled to the lower antenna along a circumference of an upper end of the lower antenna.

5. The portable terminal of claim 4, wherein the rear case is formed of a metallic material.

6. The portable terminal of claim 5, wherein, when the cover is separated from the body, the antenna and the rear case are exposed to outside the portable terminal.

7. The portable terminal of claim 1, further comprising:
   a coupling unit for coupling the rear case and the antenna.

8. The portable terminal of claim 7, wherein the coupling unit comprises:
   a first opening formed at an end of the rear case;
   a second opening provided in the antenna and connected to the first opening to face the first opening; and
   a coupling member coupling the first opening and the second opening.

9. The portable terminal of claim 1, wherein the antenna further includes a recess and the rear case is disposed within the recess.

10. The portable terminal of claim 9, further comprising:
    a coupling unit for coupling the rear case and the antenna, wherein the coupling unit comprises:
    a first opening formed at an end of the rear case;
    a second opening provided in the antenna and connected to the first opening to face the first opening; and
    a coupling member coupling the first opening and the second opening such that the portion of the first surface of the antenna and the portion of the first surface of the rear case are substantially planar.

11. The portable terminal of claim 9, wherein the coupling member is substantially planar with the portion of the first surface of the antenna and the portion of the first surface of the rear case.

* * * * *